L. T. MURRAH.
LEAF GATHERING AND LAWN TREATING IMPLEMENT.
APPLICATION FILED MAR. 11, 1916.
1,191,814. Patented July 18, 1916.
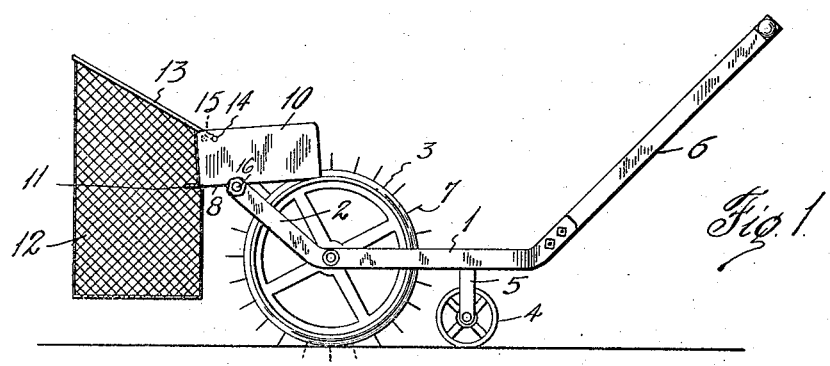
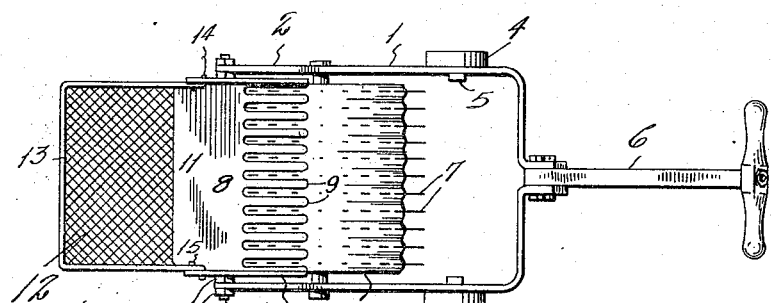
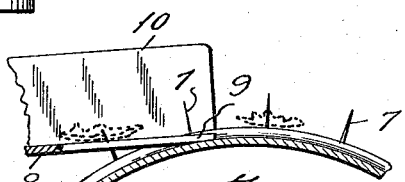
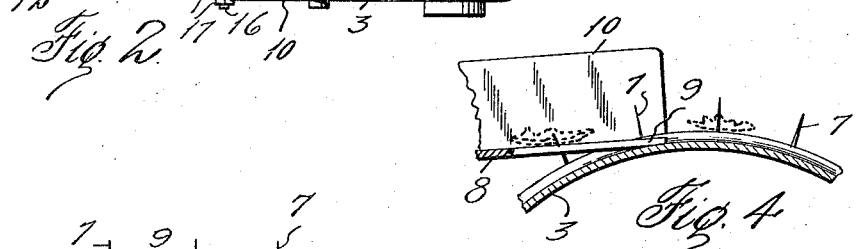
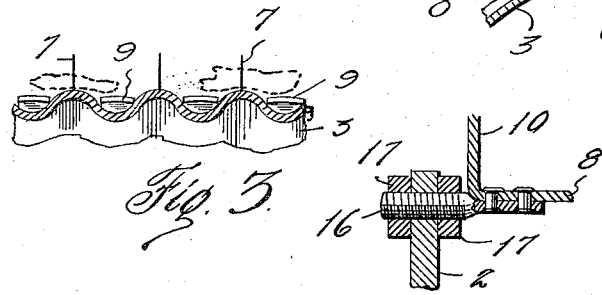
INVENTOR
L. T. Murrah.
BY
ATTORNEY

UNITED STATES PATENT OFFICE.

LOUIE T. MURRAH, OF DALLAS, TEXAS.

LEAF-GATHERING AND LAWN-TREATING IMPLEMENT.

1,191,814.  Specification of Letters Patent.  Patented July 18, 1916.

Application filed March 11, 1916. Serial No. 83,523.

*To all whom it may concern:*

Be it known that I, LOUIE T. MURRAH, a citizen of the United States, residing at Dallas, in the county of Dallas and State of Texas, have invented certain new and useful Improvements in Leaf-Gathering and Lawn-Treating Implements, of which the following is a specification.

This invention pertains to new and useful improvements in leaf gathering and lawn treating machines.

My invention contemplates a machine for the combined purposes of picking up leaves from a lawn or cultivating said lawn, by means of certain instrumentalities of a particular construction.

In carrying out the invention a drum having grooves circumferentially and radially projecting peripheral spikes is mounted in a yoke-shaped frame which has forwardly and upwardly extending arms on which the entire stripping and storing means is mounted as a unit.

A particular feature resides in means for adjustably mounting the striping device on the frame-arms, whereby it may be arcuately as well as laterally adjusted so that the stripping fingers may be caused to track properly, or may be raised entirely from the drum to reduce friction when cultivating only. For storing the leaves a receptacle is removably suspended from the wings of the stripping device in a novel manner.

Other features will be apparent from a perusal of the following specification and the invention will be more readily understood by reference to the accompanying drawings in which an example of the invention is illustrated, and wherein:

Figure 1 is a side elevation of the implement, Fig. 2 is a plan view of the same, Fig. 3 is a detail in cross section illustrating the relation of the roller, spikes and fingers, Fig. 4 is a detail of the same parts and at right angles thereto, and Fig. 5 is a detail of the stripping device mounting.

In the drawings the numeral 1 designates a yoke-shaped frame normally disposed horizontally and having upwardly and forwardly inclined arms 2. A roller 3 is journaled within the frame at the base of the arms, while trailing wheels 4 journaled on the lower ends of standards 5 depending from the frame, support the latter as indicated in Fig. 1. A suitable handle 6 extends upward at an angle from the rear end of the frame.

I prefer to form the roller of a sheet of corrugated metal shaped into a cylinder with the corrugations extending circumferentially, although the roller may be otherwise made and the invention is not limited to this construction. On the ribs or ridges of the roller spikes 7 are disposed to project radially and in rows longitudinally of the roller. I have found it convenient to "spot" weld these spikes in place, but they may be secured in any manner and other forms of pointed projections or spurs may be used.

Figs. 3 and 4 illustrate more clearly how the spikes project and show the valleys between the ridges. As the device is moved forward over a lawn the spikes will bury themselves in the sod as indicated in Fig. 1, at the same time penetrating any leaves, sheets of paper and the like lying in their path. Such matter will be retained on the spikes and carried upward by the roller. In order to remove the matter from the spikes a comb or stripping device 8 having a flat bottom and provided with a plurality of rearwardly extending fingers 9 is mounted on the upper ends of the arms 2 and inclined slightly downward in a forward direction.

The free ends of the fingers rest in the valleys of the corrugations and are thus below the ridges and the base of the spikes, consequently when the leaves, etc., reach the fingers the latter will remove them as indicated in dotted lines. It is impossible for leaves to pass under the fingers as will be evident. The stripping device is provided with sides or wings 10 whereby a chute for the leaves is formed. The bottom of the device at the forward and discharge end is extended to form an overhanging lip 11.

A receptacle 12 having an upwardly inclined bail 13 at its top is carried in front of the roller. This receptacle is preferably formed of wire fabric to permit the passage of dirt therethrough, but may be made of any suitable material. The receptacle is cut out to fit and receive the front end of the stripping device so that the lip 11 will project into said receptacle. The lower ends 14 of the bail are bent outward to engage apertures in the wings 10, while studs 15 projecting inward from the wings support the bail and the receptacle in position. The receptacle is easily removed for dumping by springing the ends 14 inward.

For adjustably mounting the stripping device 8 screw threaded trunnions 16 as shown in detail in Fig. 5 are riveted on the under side of the bottom and pass through the upper ends of the arms 2. Nuts 17 disposed on each side of each arm are tightened against the same to lock the device in position. By this arrangement the inclination of the device may be controlled and a lateral adjustment of the device is possible by displacing the nuts laterally. It is obvious that the fingers 9 may be made to track properly in valleys of the roller.

The leaves and trash carried up by the spikes 7 and removed by the fingers 9 are gradually worked over the bottom of the stripping device 8 to the lip 11 from which they fall into the receptacle 12, the wings 10 preventing scattering in windy weather. The manner of removing leaves is clearly illustrated in dotted lines in Figs. 3 and 4. When the spikes are buried in the sod they tend to disintegrate and cultivate the same so that the implement is not limited to the gathering of leaves and trash and may be used at any time for cultivating and promoting the growth of the grass on the lawn.

Various structures may be evolved in the carrying out of this invention and many equivalents well known in this and kindred arts may be selected in constructing the implement.

Having fully described my invention, what I claim, is:

1. In an implement for gathering leaves and cultivating lawns, the combination of a frame having upwardly extending arms, a drum having radial peripheral projections arranged thereon in circumferential rows, a stripping device mounted on the arms and comprising a plurality of fingers projecting between the rows of teeth of the drum and also having upstanding wings at its sides, means for adjustably supporting the device on the arms whereby said device may be adjusted laterally of the drum and also arcuately to raise or lower the fingers with relation to the drum, and a receptacle removably suspended from the wings of the stripping device.

2. In an implement for gathering leaves and cultivating lawns, the combination with a frame having arms, and a leaf gathering and lawn cultivating drum having peripheral projections, of a stripping device comprising upstanding wings at its sides and rearwardly projecting fingers overhanging the drum between the projections of the latter, trunnions projecting from the device and penetrating the frame-arms, nuts on the trunnions engaging the arms on both sides whereby said device may be shifted laterally and locked in position and also adjusted arcuately and locked in position, a receptacle having portions removably engaging the wings of the stripping device, and means on the wings for supporting the receptacle.

In testimony whereof I affix my signature.

LOUIE T. MURRAH.

Copies of this patent may be obtained for five cents each, by addressing the "Commissioner of Patents, Washington, D. C."